United States Patent [19]

Boucher et al.

[11] Patent Number: 4,497,603
[45] Date of Patent: Feb. 5, 1985

[54] PULL THROUGH BLIND RIVET

[75] Inventors: Donald A. Boucher; Gilbert D. Boucher, both of Acushnet, Mass.

[73] Assignee: USM Corporation, Farmington, Conn.

[21] Appl. No.: 392,705

[22] Filed: Jun. 28, 1982

[51] Int. Cl.³ .................... F16B 13/04; F16B 37/04
[52] U.S. Cl. .................................. 411/34; 411/70; 411/183; 411/437
[58] Field of Search .................. 411/34, 35, 36, 37, 411/38, 43, 70, 183, 436, 437, 500, 501, 525, 526, 527, 528

[56] References Cited

U.S. PATENT DOCUMENTS

| Re. 22,543 | 9/1944 | Tinnerman | 411/34 |
|---|---|---|---|
| 2,184,783 | 12/1939 | Tinnerman | 411/34 |
| 2,369,670 | 2/1945 | Gookin | 411/34 |
| 2,432,949 | 12/1947 | Thorngren | 411/70 X |
| 2,954,718 | 10/1960 | Brilmyer | 411/70 |
| 3,304,830 | 2/1967 | Schackelford | 411/34 X |
| 3,555,673 | 1/1971 | Summerlin | 411/501 X |
| 3,797,358 | 3/1974 | Allender | 411/38 |
| 3,880,042 | 4/1975 | Binns | 411/43 |

FOREIGN PATENT DOCUMENTS

| 2342203 | 6/1974 | Fed. Rep. of Germany | 411/34 |
|---|---|---|---|
| 1437477 | 3/1966 | France | 411/70 |
| 46-20765 | 11/1971 | Japan | 411/15 |
| 410423 | 5/1934 | United Kingdom | 411/34 |
| 484321 | 1/1976 | U.S.S.R. | 411/70 |

Primary Examiner—Thomas J. Holko
Attorney, Agent, or Firm—Alan N. McCartney

[57] ABSTRACT

A blind fastener of the pull through rivet type having a mandrel disposed in a hollow rivet having a flange end and a forming end, the mandrel has a head disposed adjacent the forming end and adapted to be pulled through the rivet body. The invention being in the mandrel head having a predetermined configuration acting on the forming end of the rivet while being pulled through the rivet body to upset the forming end of the rivet to provide inwardly disposed flanges. Additionally, the mandrel head configuration also upsets the rivet body and the opening in the workpiece enabling the rivet to have optimum torque carry capacity.

2 Claims, 5 Drawing Figures

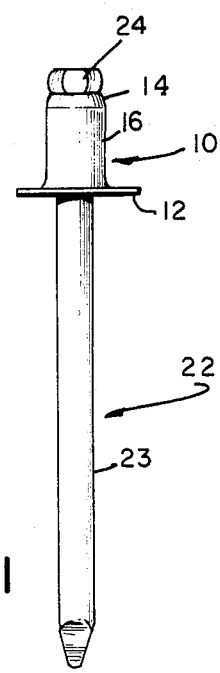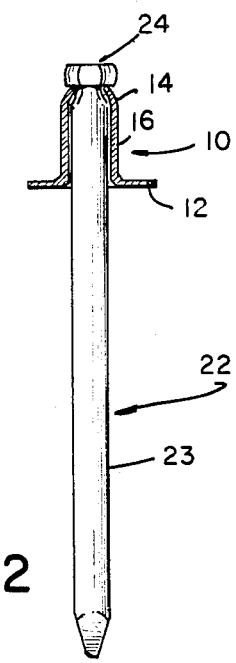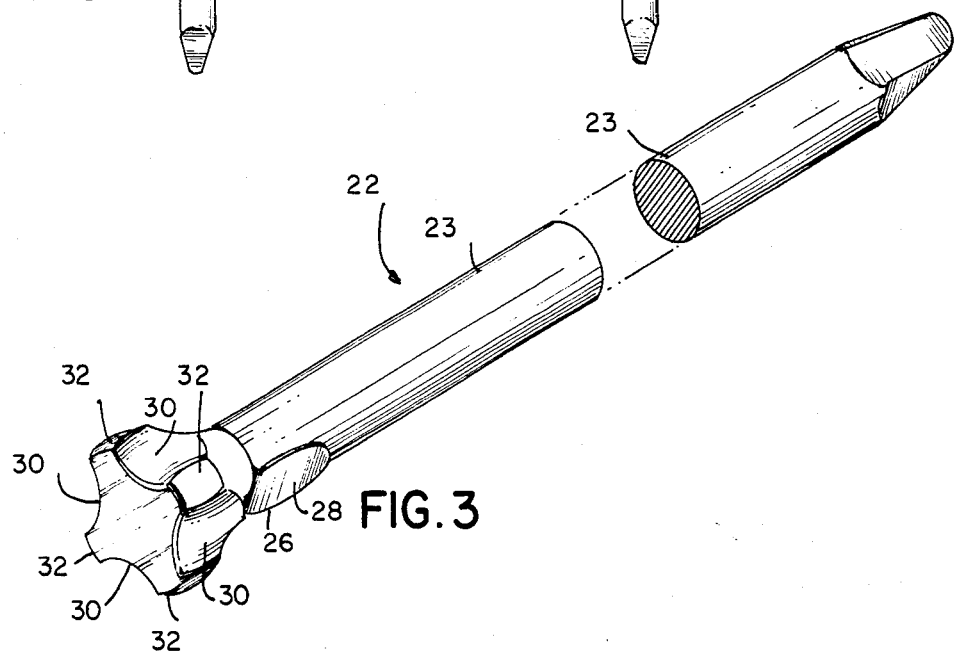

PULL THROUGH BLIND RIVET

BACKGROUND OF THE INVENTION

It is well known in the art to provide a blind rivet by having a mandrel with a head end disposed through the rivet body and by pulling the mandrel through the rivet body, the rivet is formed on one end by the mandrel head. In these devices, the mandrel head is removed or snapped off in the rivet body. However, the removed head of the mandrel can fall free from the rivet body and into the cavity of the blind side of the workpiece causing, for example, rattles in an automobile in which the rivet is utilized. Also, when used in the electrical environment, the displaced head could fall on contacts of the circuit shorting the circuit or cause other similar hazards. In other applications, it is desirable to use the blind rivet as a sleeve to receive a self-tapping screw and with a conventional blind rivet the mandrel head would prevent an obstruction to the screw. Further, the conventional blind rivet does not have torque carrying capability since the rivet can rotate with respect to the workpiece.

Therefore, it is desirable to provide a blind rivet wherein the mandrel head is pulled through the rivet body and at the same time upsetting or forming the free end and rivet body to non-rotationally secure the rivet in the opening of a workpiece. In this application, the rivet can now act as a sleeve for receipt of a self-tapping screw type fastener which can secure another workpiece to the workpiece receiving the rivet. This is particularly adaptable to securing very thin workpieces together which do not have the structural integrity to receive and hold a self-tapping screw alone.

SUMMARY OF THE INVENTION

It is the object of this invention to provide a blind rivet having a pull through mandrel head with a predetermined configuration adapted to form the free end and body of the rivet in a desired shape, thus fixing the rivet body in the workpiece opening so that the rivet will not rotate with respect to the workpiece.

It is a further object of this invention to provide a blind rivet having a pull through mandrel head with a plurality of relieved areas which localized the deformation in the free end and body of the rivet so that the rivet can be utilized as a sleeve for receipt of a self-tapping screw.

It is also an object of this invention to provide a pull through blind rivet having a mandrel head with relieved portions of a predetermined configuration to form the free end of the rivet with inwardly disposed flanges and place the rivet body under tension against the opening in the workpiece.

DESCRIPTION OF THE DRAWING

FIG. 1 is a plane view of the pull through type blind rivet of this invention;

FIG. 2 is a sectional view of the rivet;

FIG. 3 is a perspective view of the rivet mandrel illustrating the relieved areas of the mandrel head;

DESCRIPTION OF THE PREFERRED EMBODIMENT

Figure 4:
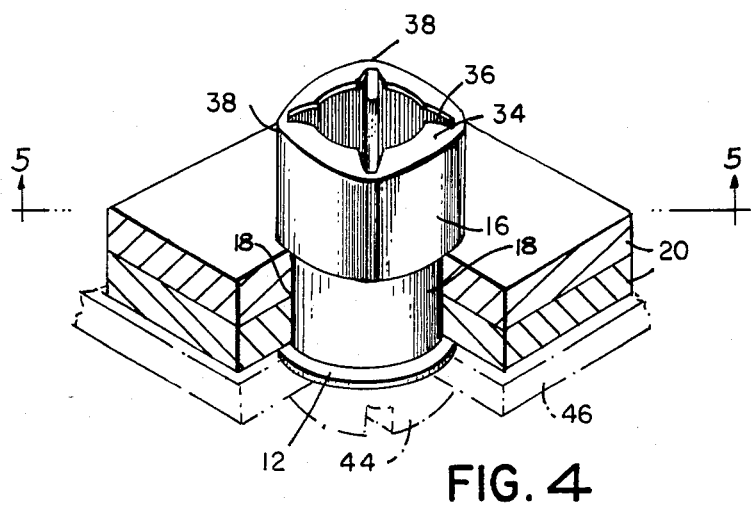
FIG. 4 is a view of the rivet in its formed condition in workpieces.

Attention is now directed to the drawings which illustrate the pull through blind rivet 10 having a flanged end 12 and a forming end 14 originally having a circular uninterrupted surface in its body 16. The rivet body 16 originally has an internal cylindrical uninterrupted surface and is adapted to pass through an opening 18 in workpieces 20 to secure them together when the workpieces have an inaccessible or blind side, as well known in the art.

A mandrel 22 has a stem 23 and a head 24. The rivet is passed over the stem and has the forming end 14 abutting the underside of the head 24. The rivet body is snap fitted over wings 28 adjacent the mandrel neck 26 to hold the rivet against the head.

In the normal application of a conventional blind rivet, the application tool pulls the mandrel stem to force the head against the rivet to form the free end of the rivet body, resulting in the mandrel head being snapped off inside the rivet body. On this type of conventional rivet, however, the mandrel head can become free from the rivet and fall into the blind area of the workpiece. Further, the mandrel head forms an obstruction in the rivet body, preventing the rivet from being used as a sleeve to hold a self-tapping screw. Additionally, the rivet is normally somewhat free to rotate or has low torque carrying capability so that a screw cannot be threaded into the rivet.

Thus, it is the intention of this invention to form a plurality of U-shaped arcuate relieved portions or areas 30 in the mandrel head 24 to leave shoulders 32 to act as the forming means to deform the end and body of the rivet. As the mandrel is pulled through the rivet body, the shoulders 32 cut into the free end of the rivet forming relieved areas 36 and inwardly disposed flanges 34. Further, since the head is pulled entirely through the rivet body, the rivet body is formed into a substantially rectangular configuration at 38 as illustrated in FIG. 4. Additionally, as the head of the rivet is pulled through the workpiece opening, that opening will also be deformed. Small shoulders 40 are formed at the contact area 42 between the rivet body and the opening in the workpiece. This resulting contact between the rivet and the workpiece places the rivet body in the opening in the workpiece under tension, assisting in preventing rotation between the rivet and the workpiece. This lends torque capabilities to the rivet so it can receive a self-tapping screw 44 to attach another workpiece 46 to the original workpieces. In this instance, the screw can bite into the sides of the rectangular body of the rivet as well as the inwardly disposed flanges 34 formed on the free end of the rivet to provide a sleeve into which a screw can be securely fastened.

It can thus be seen that with the mandrel head configuration shown, the rivet end and body are upset in a desired manner and the workpiece opening and adjacent rivet body deformed to obtain a locking action between the rivet and workpiece to arrive at optimum torque holding ability between the members.

It should also be noted that as the head is pulled through the rivet body the shoulders 32 of the mandrel head 24 scrape the sides 38 of the rivet and are removed and embedded in the inside of the rivet body. This gives additional exposed material with which the threads of the screw can interact to lock the screw in the rivet.

Figure 5:
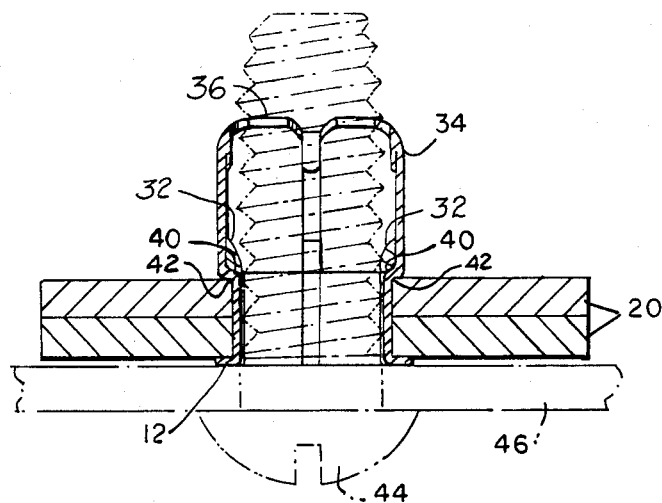
FIG. 5 is a sectional view taken along line 5—5 of FIG. 4 showing the rivet in section and receiving a self-tapping screw.

With a blind rivet of this configuration, the rivet can be inserted into material too thin to hold a self-tapping screw and act as a sleeve so that additional material can be secured to the original workpieces (as illustrated in FIG. 5).

It should be noted, however, the rivet formed by the mandrel disclosed can also be used alone to secure workpieces together where a pull-through mandrel is desirable to completely remove the mandrel head from the rivet. The resulting open fastener could be filled by any desirable material such as silicone rubber.

We claim:
1. A pull through type blind rivet comprising:
   a. a rivet having a cylindrical body portion being open at one end and terminating in a flanged head at the opposite end, the flanged head being adapted to be placed against the surface of a workpiece with said body portion being adapted to be inserted into an opening in the workpiece and extend beyond the opposite surface of the workpiece;
   b. said cylindrical body portion having an uninterrupted cylindrical surface throughout its longitudinal extent and terminating in said open end having an uninterrupted circular configuration;
   c. a mandrel having a stem adapted to be inserted into said rivet through said open end with said stem terminating in a head portion adapted to abut against said rivet open end;
   d. said mandrel having a predetermined head configuration said predetermined head configuration having means to form the open end of the rivet into a plurality of inwardly extending flanges and means to upset said rivet body into a rectangular shape, said flanges being adapted to threadably receive a screw fastener.
2. The pull through type blind rivet of claim 1 wherein said mandrel head upsets said rivet body and the opening in the workpiece into the same configuration to rotationally lock the body of the rivet into the workpiece opening.

* * * * *